(12) United States Patent
Zima

(10) Patent No.: US 9,274,512 B1
(45) Date of Patent: Mar. 1, 2016

(54) SYSTEM AND METHOD FOR MONITORING, CONTROLLING, AND OPTIMIZING THE USE OF UTILITIES

(76) Inventor: Brian Zima, Lambertville, NJ (US)

(*) Notice: Subject to any disclaimer, the term of this patent is extended or adjusted under 35 U.S.C. 154(b) by 1822 days.

(21) Appl. No.: 12/437,449

(22) Filed: May 7, 2009

(51) Int. Cl.
*G05B 11/01* (2006.01)
*G05B 15/02* (2006.01)

(52) U.S. Cl.
CPC ...................................... *G05B 15/02* (2013.01)

(58) Field of Classification Search
CPC .... G01D 4/002; Y02B 70/343; Y02B 90/245; Y02B 90/241; G05B 2219/2642; H02J 2003/143
USPC .............. 340/3.1, 3.43, 3.44, 539.11, 539.14, 340/539.16, 310.11, 506, 531, 3.7, 3.54; 700/286, 295, 17, 83
See application file for complete search history.

(56) References Cited

U.S. PATENT DOCUMENTS

| 6,580,950 B1* | 6/2003 | Johnson et al. ................. 700/17 |
| 8,095,233 B1* | 1/2012 | Shankar et al. ............... 700/148 |
| 2009/0083167 A1* | 3/2009 | Subbloie ......................... 705/34 |
| 2009/0195349 A1* | 8/2009 | Frader-Thompson et al. 340/3.1 |

\* cited by examiner

*Primary Examiner* — Nabil Syed
(74) *Attorney, Agent, or Firm* — LaMorte & Associates, P.C.

(57) ABSTRACT

A system and method of monitoring and controlling the use of utilities by devices contained within a specific location. Interactive units are provided within the selected location. A server interface is provided at the location that communicates with a remote computer server. The interactive units control the operations of different devices within the selected location that consume utilities. When used, each interactive unit generates signal information indicating whether the device controlled or monitored by that interactive unit is in operation. The signal information generated by the interactive units is sent to the server interface and then a remote computer server. The server computer analyzes the signal information to determine the amount of utilities being used and enables a programmer to set automatic and selective control parameters to minimize the cost of operations for the various devices.

8 Claims, 5 Drawing Sheets

| LOCATION | GYM ▶ | TIME | 09:45 P.M. | | |
|---|---|---|---|---|---|
| DEVICES ON-LINE | STATUS — 68 | USAGE — 69 | COST | | ALTER CONTROL PARAMETERS |
| LEFT SIDE LIGHTS | ON | 6:10:05 | $ 11.01 | | ☐ |
| RIGHT SIDE LIGHTS | ON | 6:11:29 | $ 11.05 | | ☐ |
| CENTRAL LIGHTS | ON | 6:12:15 | $ 14.10 | | ☐ |
| VENDING MACHINES | ON | 24:00:01 | $ 2.02 | | ☐ |
| WATER COOLER | ON | 24:00:01 | $ 5.09 | | ☐ |
| SCOREBOARD | OFF | 1:02:01 | $ 0.50 | | |
| HVAC THERMOSTAT | ON | 12:58:02 | $ 57.27 | | |
| TEMP SETTING - 72 | | | | | |

*FIG. 4*

SYSTEM AND METHOD FOR MONITORING, CONTROLLING, AND OPTIMIZING THE USE OF UTILITIES

BACKGROUND OF THE INVENTION

1. Field of the Invention

The present invention relates to computerized systems that control fixtures, appliances and equipment that consume a utility, such as electricity, natural gas, oil and/or water. More particularly, the present invention relates to systems that monitor the use of utilities so that fixtures, appliances, and equipment can be operated in the most cost efficient manner.

2. Prior Art Description

In the industrialized countries of the world, most every building, both residential and commercial, makes use of utilities. The utilities most commonly supplied to buildings include electrical power, water, natural gas, and/or heating oil.

The price of all utilities has been rapidly increasing. It is therefore prudent for any building owner to use all utilities as efficiently as possible. However, the efficient use of many utilities is often hampered by the limited ability a building owner has to control utilities in response to changing conditions. For example, many homes have heat provided by a natural gas furnace. The operation of the furnace is controlled by a variety of thermostats used at strategic points within the house. When a thermostat detects a temperature below a preset value, the furnace turns on and remains on until the thermostat registers a temperature above the preset value. Accordingly, if most of a house is warm and a single zone is cold, due to a partially open window for example, the furnace starts and unnecessarily consumes natural gas.

As another example, consider a school with a gymnasium containing large electric lights. The school has the lights on a timer that light the lights during school hours. However, on a few bright sunny days, the use of the lights is unnecessary. On such days, the lights are unnecessarily turned on and energy is wasted.

Some thermostats and lighting controls are programmable in that they can turn the heat and lights on and off at different times of the day. However, the presets of such controls are manually set and then often forgotten. Furnaces, lights and most all other such equipment can be run far more efficiently if their controls were constantly updated with current conditions, such as zone temperatures, rates of change for various zone temperatures, weather conditions, ambient light levels, time of day, and day of the year. The use of a constantly updated control system can also create large efficiency improvements for many other fixtures, appliances and equipment that consume a utility.

In the prior art, there are many timers and programmable thermostats that are used to turn on and off electrical lights, heating furnaces, lawn sprinklers and the like. These controls are manually programmed. The controls are not updated unless a person manually resets the control. Controls that can be updated in an ongoing manner by a computer have only recently been developed. Companies such as SmartLabs, Inc. of San Diego, Calif. have developed interactive thermostats, electrical wall plugs and electrical light switches for homes that can be controlled via a computer within that home. The computer communicates with the various controls using either a short-range wireless transmission or a signal transmitted through the wiring of the home. In this manner, a person can program the computer to turn on and off lights, heat, sprinklers, and other such devices at different times. However, although the ability to control various fixtures and appliances by computer does exist, no system in the prior uses any form of programming intelligence to operate the various fixtures and appliances in a manner that would optimize cost efficiencies.

A need therefore exists for a system and method of applying computerized analysis to the controls of fixtures, appliances and equipment that consume utilities, so that these elements can be run in a highly cost efficient manner even as conditions and other variables continuously change. This need is met by the present invention as described and claimed below.

SUMMARY OF THE INVENTION

The present invention is a system and method of monitoring and controlling the use of utilities by devices contained within a specific location. To use the system, a plurality of interactive units are provided within a selected location. A server interface is provided at the location that communicates with a computer server that is remote from the selected location. Each of the interactive units is utilized to control the operations of different devices within the selected location that consume utilities. When used, each interactive controller generates signal information indicating whether the device controlled or monitored by that interactive unit is in operation.

The signal information generated by the interactive units is sent to the server interface. Utilizing a network connection, the signal information is then forwarded to the remote computer.

The server computer analyzes the signal information to determine the amount of utilities being used by each of the devices having operations controlled by an interactive unit. Additionally, the computer server determines the cost of operations for the various devices and enables a programmer to set automatic and selective control parameters to minimize the cost of operations for the various devices.

BRIEF DESCRIPTION OF THE DRAWINGS

For a better understanding of the present invention, reference is made to the following description of an exemplary embodiment thereof, considered in conjunction with the accompanying drawings, in which:

FIG. 4 is an exemplary image of a computer programming screen generated by the present invention system.

DETAILED DESCRIPTION OF THE DRAWINGS

The present invention system and method can be used to monitor, analyze, and control utility consumption in many common applications. For instance, the present invention system can be used to control the use of sprinklers and the consumption of water at a plant nursery. Although the present invention system and method can be embodied in many ways, the exemplary embodiment selected for illustration shows the system and method being used to monitor, analyze and control the consumption of utilities by a building. This exemplary embodiment is selected in order to set forth one of the best modes contemplated for the invention. The illustrated embodiment, however, is merely exemplary and should not be considered a limitation when interpreting the scope of the appended claims.

Figure 1:
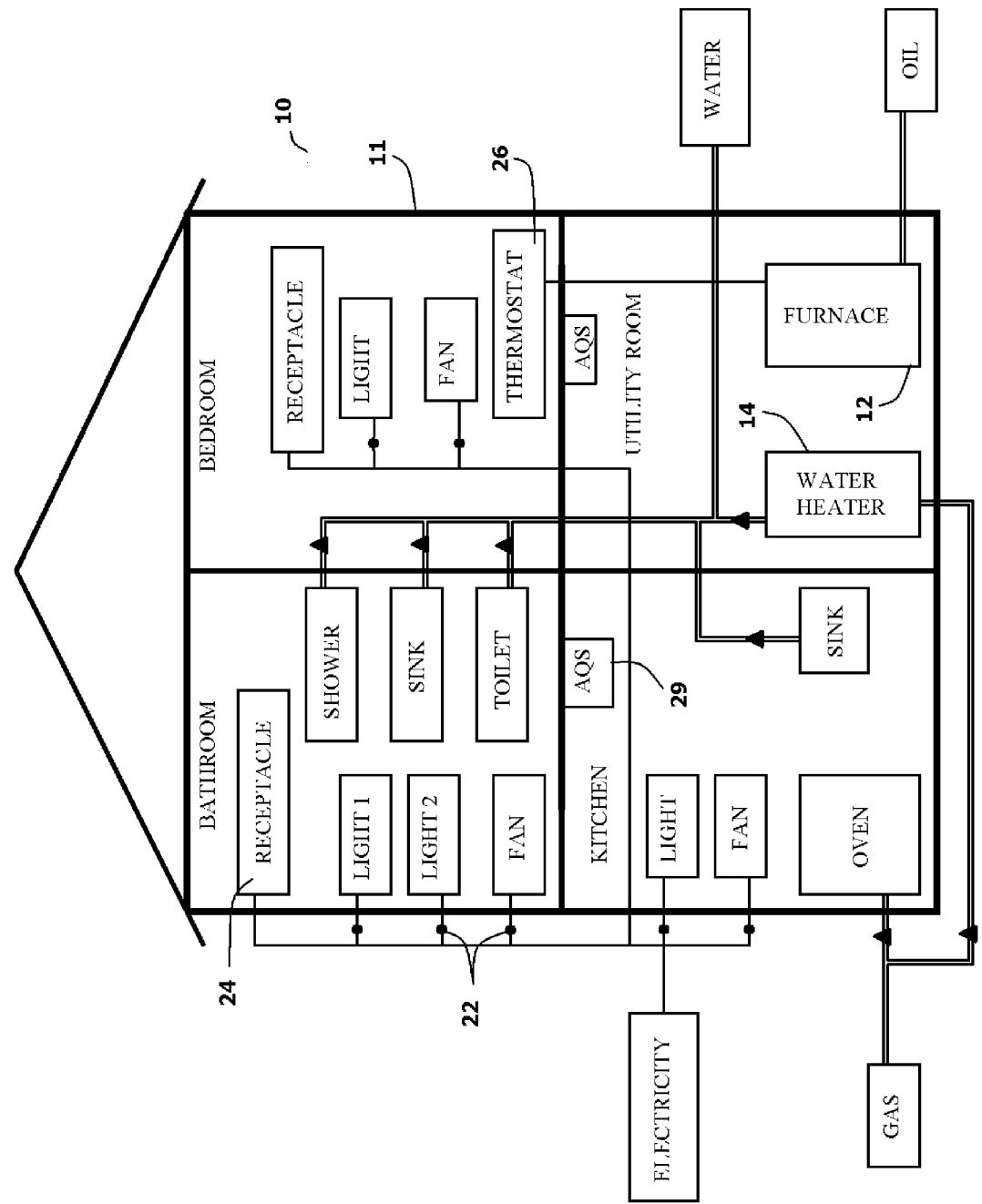
FIG. 1 is a schematic of a building containing the present invention system.

Referring to FIG. 1, a schematic is provided of a building 11 containing the present invention system 10. The building 11 can be a commercial building, such as a department store, a municipal building, such as a school, or a residential home.

In the selected embodiment, the building 11 receives four utilities, which are water, electricity, gas, and heating oil. It will be understood that some buildings may not receive gas or heating oil. However, all are shown in order to illustrate how the present invention system is capable of monitoring and analyzing the use of all utilities.

A building is divided in many ways. A building is physically divided into different rooms and different floors by way of doors, walls and other architectural features of the building. However, heat and electricity are divided among zones in the building that may or may not correspond to the architectural features of the building. For example, electricity within a building is divided into different wiring circuits that lead to and from the building's circuit breaker boxes. In accordance with modern building codes, at least two separate electrical wiring circuits extend into every major room of the building. Furthermore, within the building, there are various heating zones. Most homes have an upstairs and a downstairs heating zone. Commercial buildings and municipal buildings may have dozens of zones that are independently heated and cooled.

Water, gas, and heating oil utilities are not dispersed throughout the building 11. Rather, water, gas, and oil are directed to specific fixtures or pieces of equipment that utilize those utilities. Heating oil is directed to a furnace 12 that burns the oil to create heat. Gas is directed to gas appliances 14, such as ovens, grills, hot water heaters and the like, that burn natural gas. Water is directed to the various water fixtures 16, such as toilets, showers, and spigots within the building 11.

Traditionally, the consumption of utilities within a building is monitored by the utility companies that supply the utilities. Most commonly, this is achieved by the use of meters at the point where the utility enters the building. Such meters typically cannot be accurately read by the building owner. Accordingly, the only way a building owner can measure utility expenditure is to look at the bills provided by the utility company.

In the present invention system 10, a plurality of interactive units 20 are provided. The interactive units 20 include interactive electrical switches 22, interactive electrical receptacles 24, interactive thermostats 26, interactive flow sensors 28, and air quality sensors 29. For the purposes of this description, an interactive electrical switch 22 will be considered any switch with internal circuitry that enables the switch to be remotely activated and deactivated by a control signal. It is also preferred that the interactive electrical switch 22 transmit a status change signal each time the condition of the interactive electrical switch 22 is changed between on and off. An interactive electrical receptacle 24 will be considered any receptacle with internal circuitry that enables the receptacle to be selectively enabled or disabled by a control signal. An interactive thermostat 26 shall be considered any thermostat having an on-temperature and an off-temperature that can be selectively controlled by a control signal. It is also preferred that the interactive thermostat 26 transmit a status change signal each time the condition of the interactive thermostat 26 is changed between on and off. n interactive flow sensor 28 will be any flow sensor that measures flow of water, gas, or oil and creates an electronic signal indicative of the flow detected. Lastly, an interactive air quality sensor will be any device that senses the presence of harmful gases or particulates in the air, such as carbon monoxide, natural gas, smoke, pollen pollutants, and the like. The interactive air quality sensor produces a signal that corresponds to the air quality being detected.

The control signals utilized by the interactive electrical switches 22, interactive electrical receptacles 24, and interactive thermostats 26 may be wireless signals or may be signals that transmit through the electrical wiring of the building 11. Likewise the electronic signals generated by the interactive flow sensors 28 and interactive air quality sensors 29 may be wireless signals or may be signals that are transmitted through the wiring of the building 11.

Figure 2:
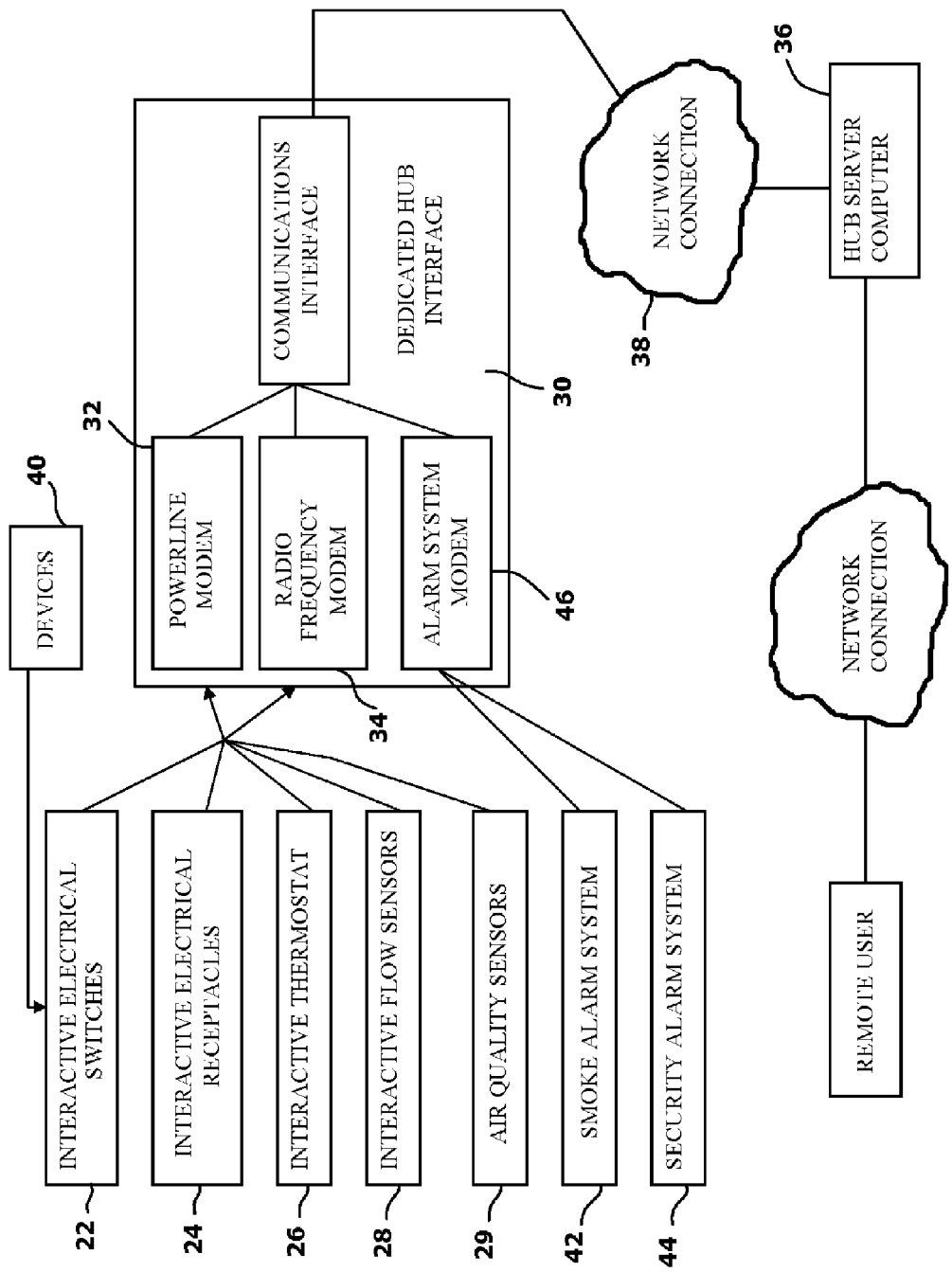
FIG. 2 is a schematic that shows the system within the building of FIG. 1 interacting with a remote computer server.

Referring to FIG. 2 in conjunction with FIG. 1, it can be seen that the various signals received and/or transmitted by the interactive electrical switches 22, interactive electrical receptacles 24, interactive thermostats 26, interactive flow sensors 28 and interactive air quality sensors 29 all originate from, or are transmitted to, a dedicated hub interface 30 that is provided onsite at the building 11 being monitored. Within the dedicated hub interface 30 is a powerline modem 32 that receives any signal that is transmitted by the interactive electrical switches 22, interactive electrical receptacles 24, interactive thermostats 26, interactive flow sensors 28, and interactive air quality sensor 29 through the wiring of the building 11. Likewise, a radio frequency modem 34 may be provided for receiving any radio signal transmitted by the interactive electrical switches 22, interactive electrical receptacles 24, interactive thermostat 26, interactive flow sensors 28, and air quality sensor. The powerline modem 32 and the radio frequency modem 34 convert the signals into an appropriate format and forward the signals to the dedicated server interface 30. The dedicated server interface 30 is connected to a remote hub server computer 36 via a network connection 38. In most applications, the network connection 38 will utilize the Internet. However, other computer networks can be used.

The hub server computer 36 runs specialized software to analyze the data received from the dedicated server interface 30. As will be explained, the purpose of the software is to analyze the data and determine more energy efficient ways to run the various devices 40 within the building 11 that are coupled to, or effect, the interactive electrical switches 22, interactive electrical receptacles 24, interactive thermostat 26, interactive flow sensors 28, and interactive air quality sensors 29.

The interactive electrical switches 22, interactive electrical receptacles 24, interactive thermostat 26, interactive flow sensors 28 and interactive air quality sensors either are constructed into the building 11 or are added to the building 11 in a retroactive manner. In addition to these interactive units, most buildings have other sensory systems. Under the building code, every building must have a smoke alarm system 42. In modern commercial buildings and modern residential buildings, the smoke alarms in the smoke alarm system 42 are hardwired together in a single circuit. In this manner, if one smoke alarm activates, all the smoke alarms activate.

In addition to a smoke alarm system 42, many buildings also have security alarm systems 44. The security alarm system 44 may be detailed, providing open and closed indications for every window and door. Alternatively, the security alarm system 44 may be general, with motion detectors that indicate whether or not people are present within different regions of the building 11. If such a smoke alarm system 42 and/or security alarm system 44 is present in the building 11, the alarm systems can be interconnected with the dedicated server interface 30. The dedicated server interface 30 contains an alarm signal modem 46 that converts the alarm signal to the proper format and sends those signals to the dedicated server interface 30. The dedicated server interface 30 then sends that information to the hub server computer 36 via the network connection 38.

Ambient conditions also effect the energy consumption of a building. For example, more lights are used on overcast days than are used on sunny days. The geographical location of a building is known. The ambient conditions for that geographical location can be obtained over the Internet from a variety of on-line weather services. Accordingly, the hub server computer 36 may also monitor weather conditions from an independent weather information source via the network connection 38.

The interconnection between the interactive electrical switches 22, interactive electrical receptacles 24, interactive thermostat 26, interactive flow sensors 28, interactive air quality sensors, and alarm systems 42, 44 are bidirectional. It will therefore be understood that signals originating at the hub server computer 36 can be received by the interactive electrical switches 22, interactive electrical receptacles 24, interactive thermostat 26, interactive flow sensors 28, interactive air quality sensors, and alarm systems 42, 44.

As has been previously mentioned, the hub server computer 36 is coupled to a network, such as the Internet. As such, the hub server computer 36 can communicate with other web server computers. Web server computers interconnect various interface devices, such as personal computers, laptops, and cell phones to the Internet. It will therefore be understood, that utilizing the proper access codes, an individual having access to the Internet can send signals to, or receive data from, the hub server computer 36.

Figure 3:
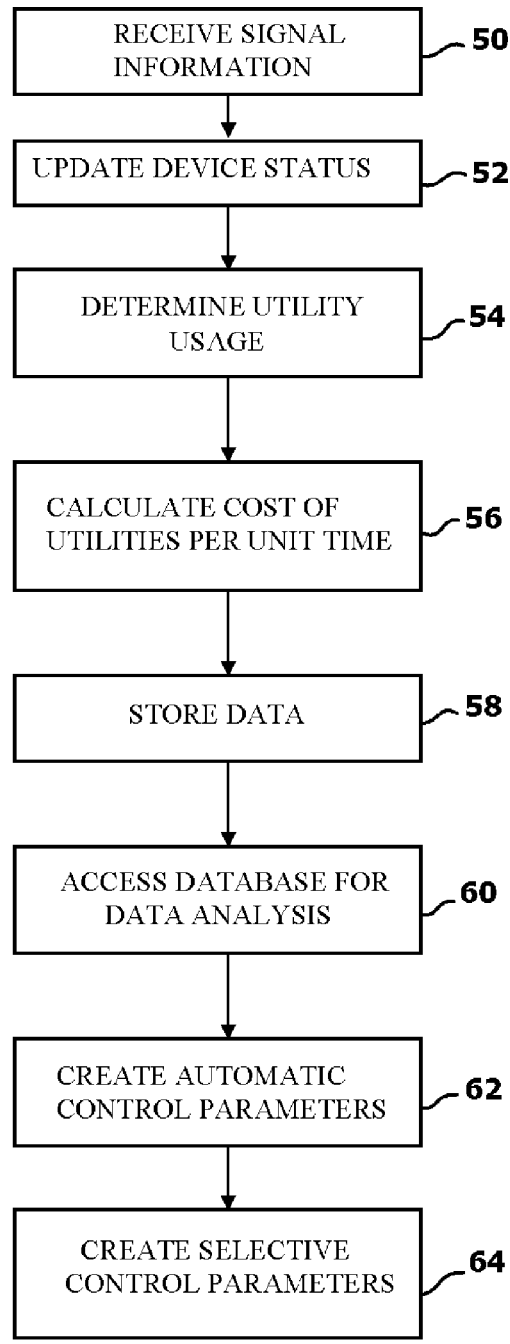
FIG. 3 is a block diagram illustrating a method of operation for the system.

Referring now to FIG. 3 in conjunction with FIG. 2, it will be seen that the hub server computer 36 constantly receives data from the interactive electrical switches 22, interactive electrical receptacles 24, interactive thermostats 26, interactive flow sensors 28, interactive air quality sensors, and alarm systems 42, 44. See Block 50. As the data is received, any changes in the operational status of any interactive electrical switches 22, interactive electrical receptacles 24, interactive thermostats 26, interactive flow sensors 28, interactive air quality sensors or alarm systems 42, 44 is updated. See Block 52. The prices of utilities, such as water, gas, electricity, and heating oil are known. In some areas of the country, the cost of utilities, such as water and electricity vary according to the time of day. The costs of all utilities are preprogrammed into the hub server computer 36 and are updated whenever a price change for a utility occurs.

The incoming data from the interactive electrical switches 22, interactive electrical receptacles 24, interactive thermostats 26, interactive air quality sensors, and interactive flow sensors 28 informs the hub server computer 36 as to what utilities are being consumed and at what rate of consumption. See Block 54. For example, in a school, it would be known whether or not the gym lights were on or off. The number and wattage of the gym lights is known. As such, the amount of electricity consumed by the gym lights can be known simply by knowing whether or not the gym lights are turned on or off.

Using the incoming data from the interactive electrical switches 22, interactive electrical receptacles 24, interactive thermostats 26, interactive air quality sensors and interactive flow sensors 28 as well as the known price of utilities, the cost of the utilities is calculated. See Block 56. The cost of utilities can be determined for any unit of time, such as by the minute or hour. Furthermore, the price of utilities can be determined by building, room, zone and/or individual fixture by selectively adding together incoming data. For example, the cost of running the gym lights can be calculated. Furthermore, the cost of running the scoreboards, the vending machines and the ventilation fans in the gym can be calculated. The costs of heating and cooling the gym can also be calculated. All of these calculations can be added together to determine the total cost of utilities for running the gym.

The data generated by each of the interactive electrical switches 22, interactive electrical receptacles 24, interactive thermostats 26, interactive flow sensors 28 and interactive air quality sensors 29 is stored in a database for analysis. See Block 58. This data is accessible through the Internet by any authorized user.

As is indicated by Block 60, the stored data is accessed by an energy efficiency technician. The energy efficiency technician studies the data trying to determine ways to reduce, conserve and efficiently utilize the consumption of utilities. The energy efficiency technician first creates a series of automatic control parameters. See Block 62. The automatic control parameters are designed to reduce the wasteful use of utilities. For example, lights may be turned off in some of the minor rooms if the security alarm system does not detect movement in those rooms for a predetermined period of time. Heating or air conditioning may be turned off for any room where the security alarm system detects that windows are open. General lighting will be reduced on sunny days or only used on rainy days. Such simple automatic control parameters can result in an average energy savings of over ten percent for most large buildings.

In addition to automatic control parameters, an energy efficiency technician may utilize the data to make selective control parameters. See Block 64. For example, an energy efficiency technician may control electric water heaters to only heat water during off-peak hours. Likewise, depending on outside temperature, heating and cooling may only be operated during the morning hours. The residual heat or air conditioning may then be sufficient to keep the building comfortable through the rest of the business day. Similar economies can be made for the usage of all devices 40 that use utilities. The data from all interactive units is stored in a database. An energy efficiency technician can search the database of past situations that mimic current conditions. For example, an energy efficiency technician may determine that given certain weather conditions during a certain time of year, the cost of running the gymnasium was $12.62 per hour, given certain automatic control parameters. The energy efficiency technician can then try to tweak the automatic control parameters with selective control parameters in order to improve the cost efficiencies associated with operations. Even small efficiency savings can add up to many thousands of dollars in operational cost savings.

Energy efficiency technicians will only add selective control parameters to the system only time to time. Automatic control parameters can be continuously created using algorithms. For instance, it may be noticed by the use of algorithms, that an air conditioning system of a building runs the most cost effectively given certain ventilation fan configurations. Recognizing an occurrence of a higher than normal efficiency, the system may attempt to mimic conditions that produced that increase in efficiency. If the attempt works, the new settings may be automatically retained as the new control parameters. If the attempt does not work, the settings may revert back to those selected by the energy efficiency technician.

Referring to FIG. 4, a sample of a screen is shown that may be used by an energy efficiency technician. The technician selects a location within the building. See field 66. For the purposes of consistency, the exemplary screen shows the gymnasium within a school. Once a location is selected, all the devices 40 within that location that consume utilities are listed. In the shown example, the devices 40 include left side lights, central lights, right side lights, scoreboard, vending machines, water fountain, and the heating/air conditioning (HVAC) unit. The status 68 of the controls for each of the listed devices 40 is shown. For the given example all of the devices are turned on.

A usage indicator 69 is provided. The usage indicator 69 shows how long the various devices 40 have been on in a given period of time. For the example, that given period of time is one day. However, the technician can change that reference period of time to an hour, week, month or year. In the shown example, it can be seen that the vending machines and the water fountain are constantly left on and have been active twenty-four of the last twenty-four hours. The various gym lights have been on six of the last twenty-four hours. The scoreboard has been on for one hour.

For each device 40 listed, the cost of running that device 40 is calculated. In the listed example, the lights cost $36 dollars to operate. The scoreboard cost $0.50 to operate. The vending machine cost $2 to operate. The HVAC cost $57 to operate and the water cooler cost $5 to operate. Utilizing this data, the energy efficiency technician enters automatic control parameters and selective control parameters that can instantly reduce utility usage and save money. For instance, the technician may recognize that the vending machines and water cooler need not be activated twenty-four hours a day. By reducing the operating time of these components in half, a savings of close to $5 dollars a day can be obtained. Furthermore, it may be possible to use only the center lights of the gym during daylight hours on sunny days. On such days, the lighting costs can be reduced by one third, which is a $12 savings. Similarly, it may be determined that the HVAC equipment may be turned off one hour early without any adverse effect on gym conditions. This is a 10% savings, which results in a $5.70 savings per day. Adding all of the savings together, the school saves over $22/day, just in the operation of the gym. Using the present invention system throughout a large municipal or commercial building can save hundreds of dollars per day. In a typical home, such controls can save hundreds of dollars per year.

Figure 5:
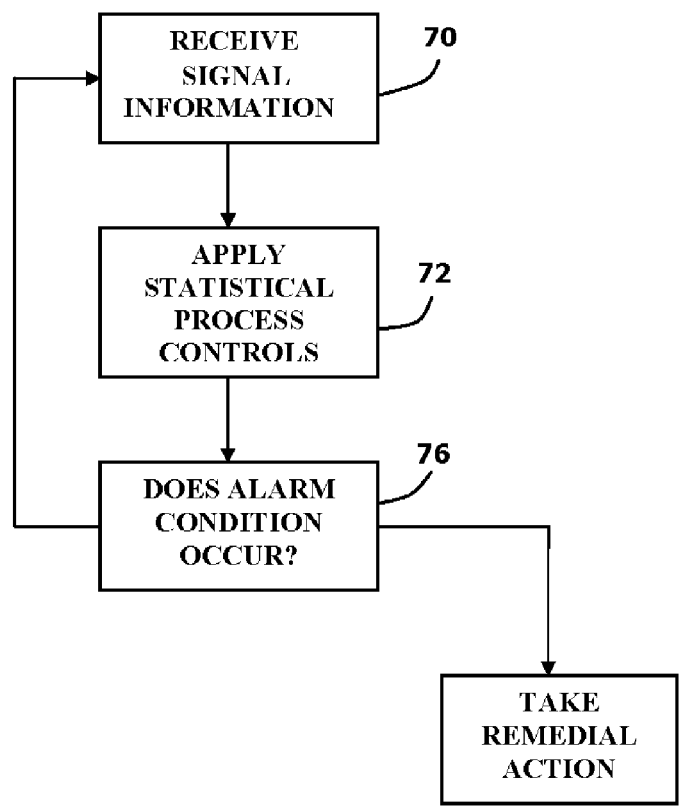
FIG. 5 is a block diagram showing emergency control parameters.

Referring lastly to FIG. 5, it will be understood that in addition to automatic control parameters and selective control parameters, a technician can also enter emergency control parameters. The present invention system 10 is capable of detecting emergency conditions, such as a fire, water leak, gas leak and even structural damage to a building. If such a condition is detected, utilities can be controlled accordingly.

As is indicated by Block 70, the system receives data from the various interactive components. As is indicated by Block 72, the system performs statistical analysis on the data. If the data is out of the statistical controls, then an alarm condition is identified. See Block 76. For instance, if the amount of water being used, far exceeds the amount of water ever used before, it can be assumed that a pipe has burst or another substantial leak has occurred. The technician can program the system to turn off the water and the water heaters should this condition be detected.

Similarly, suppose the system detects the activation of the fire alarms. The system may then automatically turn off the natural gas to the building until the fire alarms are reset.

By detecting the usage of all utilities, instant increases of efficiency can be achieved in most any location that previously used simple utility controls. It will be understood that the embodiment of the present invention that is illustrated and described is merely exemplary and that a person skilled in the art can make many variations to that embodiment. All such embodiments are intended to be included within the scope of the present invention as defined by the claims.

What is claimed is:

1. In a location having devices that utilize utilities, a method of monitoring and controlling the use of said utilities by said devices within said specific location, said method comprising the steps of:

providing an alarm system within said specific location having alarm sensors that monitor areas within said specific location, wherein said alarm system create alarm signals indicative of some physical conditions within said areas of said specific location;

providing a plurality of interactive units within said location;

providing a server interface at said location;

providing a server remote from said location;

utilizing each of said interactive units to monitor operations of different devices within said location that consume utilities, wherein each of said interactive units generates signal information indicating whether a device being controlled is in operation;

providing at least first modem for converting said signal information into a protocol acceptable to said server interface;

providing at least one second modem for converting said alarm signals into said protocol acceptable to said server interface;

transmitting said signal information and said alarm signals to said server interface;

utilizing a network connection to forward said signal information and said alarm signals to said server;

analyzing said signal information and said alarm signals in said server to determine economically optimum utility usage for each of said devices having operations monitored by one of said interactive units and under said physical conditions indicated by said alarm signals.

2. The method according to claim 1, further including the step of analyzing said signal information in said server to determine the cost per unit time of each of said devices having operations monitored by one of said interactive units.

3. The method according to claim 1, wherein said step of providing a plurality of interactive units within said location includes providing a plurality of interactive units within a building.

4. The method according to claim 1, wherein said step of providing a plurality of interactive units includes providing interactive units selected from a group consisting of interactive electrical switches, interactive electrical sockets, interactive thermostats, interactive flow sensors and interactive air quality sensors.

5. The method according to claim 1, further including the step of programming automatic control parameters into said server that automatically alter operations of at least one of said devices whenever conditions corresponding to said automatic control parameters occur.

6. The method according to claim 1, further including the step of programming selective control parameters into said server that alter operations of at least one of said devices whenever conditions corresponding to said selective control parameters occur.

7. The method according to claim 1, further including the step of programming emergency control parameters into said server that alter operations of at least one of said devices whenever conditions corresponding to said emergency control parameters occur.

8. The method according to claim 3, further including the steps of providing a fire alarm system that generates fire alarm signal information in response to detection; and forwarding said fire alarm signal information to said server through said server interface.

\* \* \* \* \*